Sept. 21, 1965    E. D. MacDONALD    3,207,025
OPTICAL SYSTEM FOR PERISCOPIC SEXTANT
Filed July 14, 1960    3 Sheets-Sheet 1

INVENTOR.
ERVIN DOUGLAS MacDONALD
BY
OSTROLENK, FABER, GERB & SOFFEN

ATTORNEYS

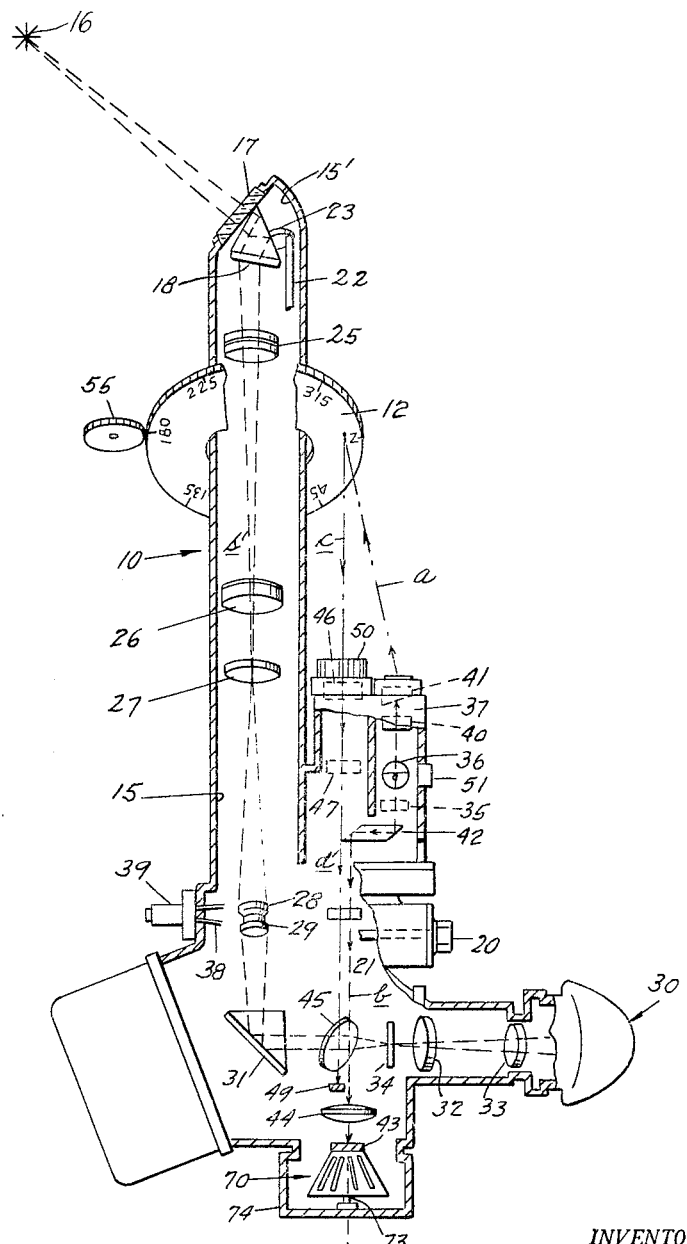

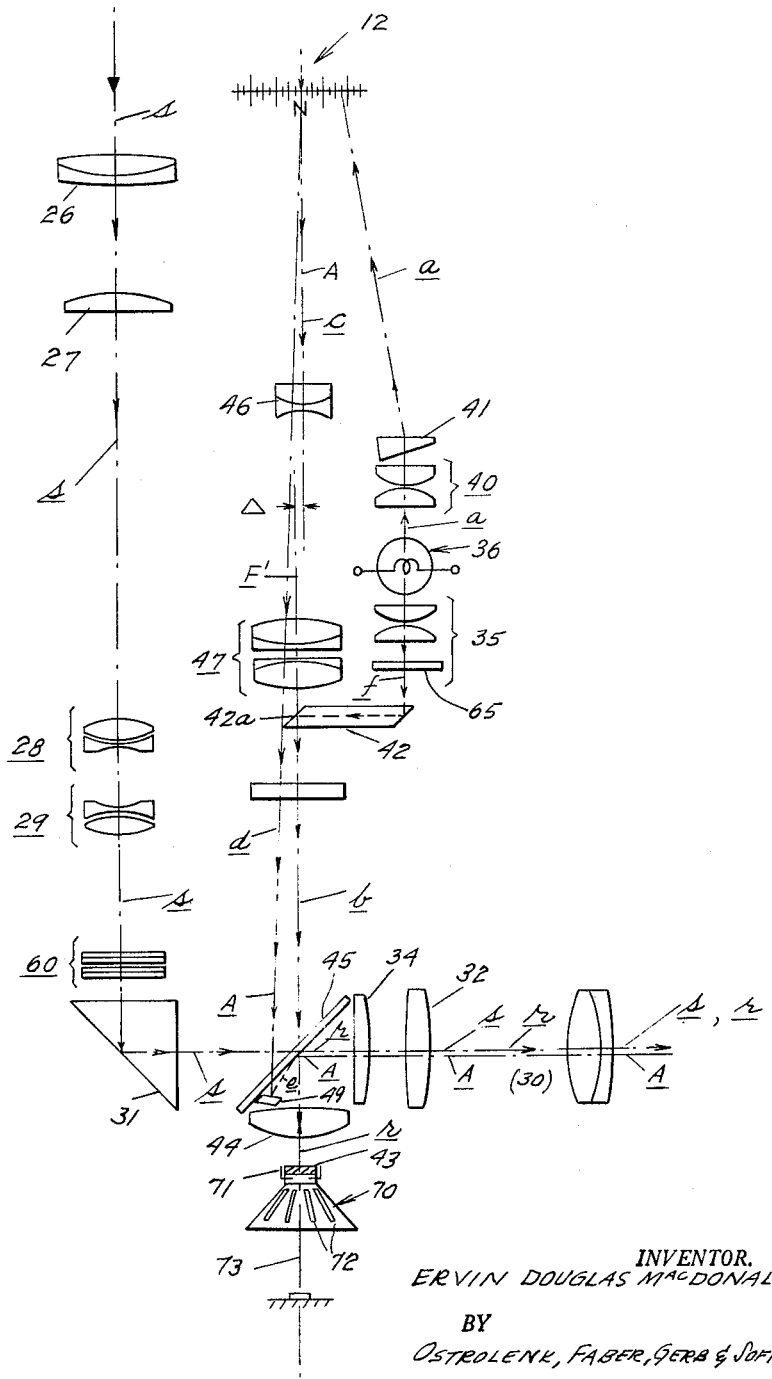

United States Patent Office 3,207,025
Patented Sept. 21, 1965

3,207,025
OPTICAL SYSTEM FOR PERISCOPIC SEXTANT
Ervin Douglas MacDonald, East Williston, N.Y., assignor to Kollsman Instrument Corporation, Elmhurst, N.Y., a corporation of New York
Filed July 14, 1960, Ser. No. 42,940
3 Claims. (Cl. 88—2.7)

This invention relates to the provision of a novel optical system for periscopic sextants, and more particularly relates to such systems for simultaneously viewing an astrocompass or true heading indicator in conjunction with the sextant position determinations. The present invention constitutes an improvement for periscopic sextant apparatus as disclosed in U.S. Patent No. 2,579,903 for "Periscopic Sextant," assigned to the assignee of this case.

In accordance with the invention hereof a single optical light or projection unit illuminates the external azimuth scale, projects the reflected light from the scale into the sextant body, and provides an alluminated reticle, the light from which, is also projected into the sextant body. The lens of the pendulous mirror has a longer focal length permitting the reticle to be placed in the new optical unit. A fixed mirror, adjacent to the pellicle, reflects the light from the azimuth scale off the pellicle to the common focal plane for the eyepiece.

The improved efficiency of the pendulous mirror together with the brighter illuminated reticle projects, in combination with the pellicle, a stabilized image of the reticle at the common focal plane. The light from the star passes through the pellicle and also forms an image of the star at the common focal plane as before.

A rugged, compact and efficient optical system is thus effected. The invention system is readily adjusted, maintained, and serviced. The lighting of the reticle, azimuth scale and horizontal mirror is ample, yielding clear composite indications thereof without detracting from the inherently weaker star image. The optical system hereof is entirely outside of the main sextant body. Improved features of the pendulous mirror per se render it distortion-free and better reflecting.

It is a primary object of the present invention to provide a novel optical system for a periscopic sextant.

Another object of the present invention is to provide a novel optical system with a reticle exterior of the sextant body, and a companion exterior lighting system.

A further object of the present invention is to provide a novel optical system for a periscopic sextant-azimuth scale combination, utilizing a pendulous mirror internally, with the scale, star and mirror stabilized horizon images focused through a common plane to the eyepiece.

These and further objects of the invention will become more apparent from the following description of an exemplary embodiment thereof, illustrated in the drawings, in which:

FIGURE 2 is a vertical cross-sectional view through the system of FIGURE 1, showing the arangement of the optical elements thereof.

FIGURE 3 is an enlarged diagram of the optical elements of the system of FIGURES 1 and 2.

Figure 1:
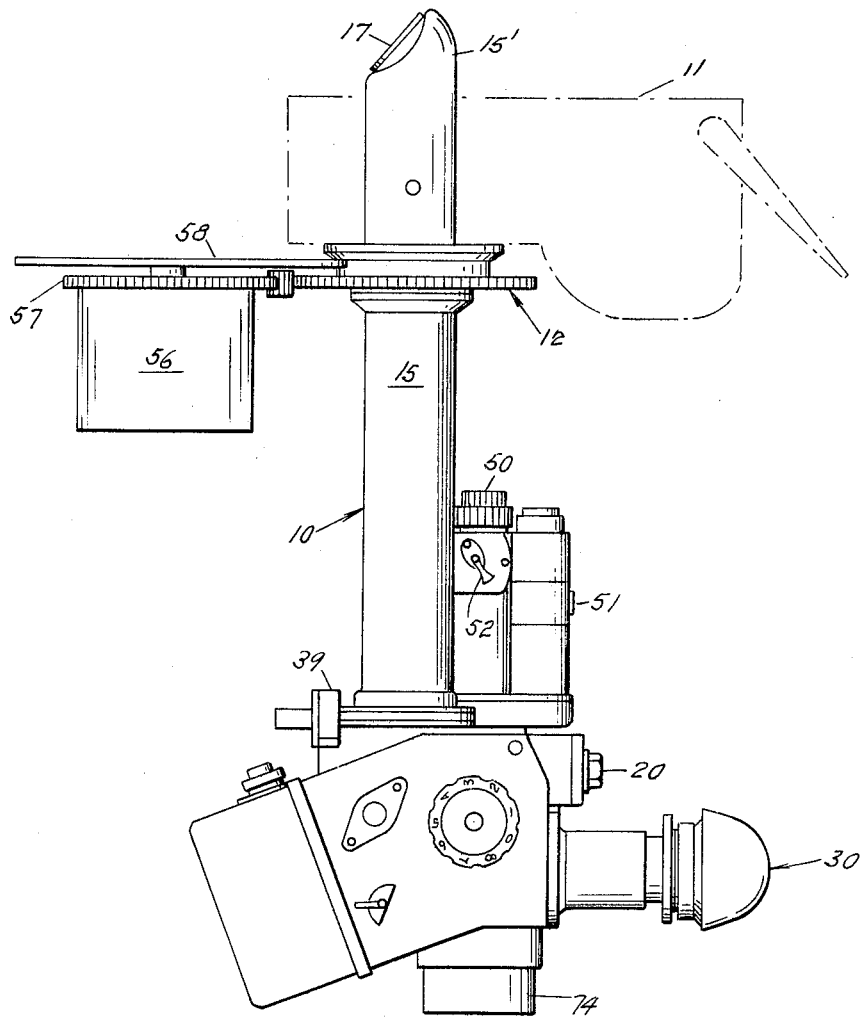
FIGURE 1 is a side elevational view of a periscopic sextant system incorporating the invention.

The periscopic sextant 10 of FIGURES 1 and 2 corresponds generally to the type illustrated in FIGURES 1 and 2 of the aforesaid patent, and utilized for the same purpose and operations. The mount 11 for sextant 10, in conjunction with the geared azimuth scale 12 is particularly adapted to function as an astrocompass or true azimuth indicator in addition to performing its original function of determining position.

The azimuth scale 12 is mounted rotatably on the lower side of the mount 11 around the opening in the mount through which the tube 15 of the periscopic sextant is inserted. The mount 11 is affixed to the roof of a vehicle or craft as shown in U.S. Patent No. 2,554,010, with tip 15′ extending through the mount 11 to the outside. The sextant tube 15 is releasably held in the mount 11 for rotation about its own vertical axis and my be swung on the universal gimbals supported in and a part of the mount, all as shown in said Patent No. 2,554,010. The scale 12 is rotatably supported on the under side of the mount 11 so that it swings on the universal gimbals with tube 15 as shown in substantially the manner that ring 34 is supported in the said patent.

It will be seen that the azimuth scale 12 and the vertical tube 15 of the sextant 10 have the same vertical axis of rotation so that the reticle line in the sextant eyepiece may be used as the index line against which true azimuth may be read.

It is in fact the periscopic construction of the sextant which makes it possible to rotate it on a common axis with the azimuth scale 12, which in turn makes it possible to convert the periscopic sextant into an efficient and simple astrocompass. When the periscopic sextant tube 15 is inserted in the mount 11 in operative position, light from any celestical object, as a star 16, to which the sextant is directed enters window 17 (FIGURE 2) and the index prism 18. The index prism 18 is rotatable about a horizontal axis to permit observation at any angle from −10° to +92° elevation. The rotation of the index prism 18 is controlled by a knob 20 through rod 21, 22 by intermediate linkage not illustrated but as shown in Patent No. 2,894,330. Rod 22 operates lever 23 at prism 18 under the control of knob 20 to displace the objective image at the rate of five degrees per revolution. A counter (not shown) may be connected to rod 21 to indicate the altitude angle in degrees and minutes.

The light reflected from prism 18 passes through the objective lenses 25 and 26 and the objective field lens 27 and through an erecting system comprising lenses 28 and 29. The light from the star 16 is then directed toward the eyepiece 30 by means of the 90° fixed prism 31 and forms a real image at the focal plane of the erecting system. The focal plane of the eyepiece system comprising lenses 32 and 33 coincides with the focal plane of the erecting system at lens 34. More detailed optical correlations are described hereinafter in connection with FIGURE 3. An illuminated reticle unit 35 carrying a horizontal line (for cooperation with the artificial horizon) and a vertical line (the true azimuth index) is located exterior of sextant tube 15. The elements of the reticle unit are further illustrated in FIGURE 3 and contain the cross-lines stated herein, that are projected to the single eyepiece.

An electric lamp 36 in exterior section 37 is energized through leads 38 of connector 39. Lamp 36 forms illuminating beams focused by lens unit 40 and prism 41 upon the region of azimuth scale 12 to be projected to the eyepiece 30. The reticle unit 35 containing the reticle, focuses beam *b* from lamp 36 to prism 42, and in turn through pellicle 45 and lens 44 to the pendulous mirror 43 back through lens 44 and is reflected by pellicle 45, which acts as a semi-reflective element. The mirror 43 thus reflects the light of the reticle reference lines directed upon it back through lens 44 and upon pellicle 45 to the focal plane at lens 34 for the eyepiece 30.

The region of scale 12 illuminated by beam *a* returns as beam *c* through eccentrically mounted lens 46 and lens 47 as beam *d*. Scale image beam *d* passes through pellicle 45, and is reflected by side mirror 49 and the pellicle to focal plane lens 34 and eyepiece 30. Lens unit 46, being eccentrically mounted at a fixed focal position at tube end 50, provides a means of laterally shifting scale image as a means of optical alignment adjustment while retaining a sharp image of the scale region. A plug 51 at the side of the lamp tube permits direct servicing of lamp 36. A shutter lever 52 (FIGURE 1) permits shuttering off of the scale 12 image for conventional sextant position determinations.

In combining the azimuth scale 12 for true heading determinations the gear rimmed azimuth scale 12 is automatically operated through pinion 55 by a computer unit 56 through its output gear 57. The azimuth scale may alternatively be manually rotated. A common bracket 58 supports the computer 56 and sextant 10. The main computer is remotely mounted and drives the unit 56 through synchronous means, as set forth in the Patent No. 2,894,-330 referred to hereinabove. The remote computer (not shown) is set for local latitude and longitude and the star's position, the latter being continuously corrected for the earth's rotation by clockwork. The resulting output to gear 57 transmitted to scale 12 by pinion 55 is the true azimuth of the selected star. Reference is made to the above-mentioned patent for details as to the computer and use of the sextant as an astrocompass. The unlabeled portions of sextant 10 are not referred to herein, as their use is pertinent to normal sextant operation well understood by those skilled in the art.

FIGURE 3 diagrammatically illustrates in detail the novel optical system of the sextant 10. The image of the celestial object, as star 16, is directed as beam *s* through objective lenses 25 and 26 and field lens 27 to the erecting lenses 28, 29. The beam *s* may then be passed through optical filters 60 to 90° prism 31. Beam *s* emerges from prism 31, through pellicle 45 and is focused into the focal plane at lens 34. The star image is thereupon directed to the eyepiece 30 through ocular lenses 32, 33.

The lamp 36 directs beam *a* through lens unit 40 and prism 41 to the region of azimuth scale 12 above lens 46. The image beam *c* for scale part (A) is laterally shifted by lenses 46 and 47 by an amount indicated as Δ. In the exemplary optical system Δ was 2 mm. The beam is thus angularly displaced to path *d*. The path *d* directs image (A) to a small mirror 49 just beyond the pellicle 45, and then along path *e* for reflection by the pellicle along the axis of the eyepiece 30 and into the focal plane at lens 34. The image A of scale 12 is thus coincident in the eyepiece 30 to one eye with that of the star as well as of the reticle.

The lamp 36 directs light to lens unit 35 as a beam *f* into rhomboid prism 42. This light beam emerges as aforesaid beam *b* through lens 44 to the pendulous mirror 43 through lens 44 and pellicle 45. An illuminated reticle is provided at element 65 of lens unit 35, and thus its image of cross-lines is composed in beam *b* which is reflected from mirror 43 as beam *r*. The reflected beam *r* passes again through lens 44 and is reflected by pellicle 45 to a focal plane at lens 34.

The reticle beam *r*, duly oriented by pendulous mirror 43, is thereupon directed through the eyepiece 30 to the eye with the real images of the star 16 selected and of the azimuth scale region A. The navigational correlation of this composite optical data through eyepiece 30, namely images *s*, *r*, and A, is identical to that detailed in Patent No. 2,894,330 referred to, and reference is made thereto.

The pendulous mirror 43 is mounted in a cavity 71 at the apex region of aluminum skirt 70. The skirt is lightened by cut-out regions 72, 72. The pivot post 73 couples with the apex region internally to freely pivot the mirror 43 with skirt 70. The mirror 43 is cemented into cavity 71 whereby it is mounted free of strains or distortion. The mirror 43 is preferably of glass to utilize reflection from its second surface to derive highly efficient reflection of light from reticle 65 into eyepiece 30. Access to pendulous assembly 70 is directly at base 74 of sextant 10.

Having thus described the exemplary optical system, it is to be understood that modifications thereof may be made by those skilled in the art that fall within the broader spirit and scope of the invention as set forth in the following claims.

What is claimed is:

1. An optical system for a periscopic sextant used in conjunction with an external azimuth scale of the character described comprising a periscope tube, said azimuth scale positioned coaxial with said periscope tube at the upper end thereof, first lens means along said tube for deriving a beam from a celestial body, an eyepiece section transversely extending from the lower end region of said tube and containing a common focal plane and ocular lenses focused at said focal plane, a semi-reflective pellicle at the lower end region of said tube between said focal plane and said first lens means, said first lens means projecting the celestial beam first downwardly to reflecting means and then in a transverse direction, through said pellicle to said focal plane, and thereby creating a real image of the celestial body at the common focal plane, lamp means mounted external of said periscope tube; second optical means including an illuminating lens for projecting a light beam from said lamp means upwardly upon said azimuth scale, said second optical means also including a lense arrangement vertically extending adjacent said periscope tube and said illuminating lens to form a reflected image beam of a portion of the scale illuminated by said lamp means and project it downwardly through an opening extending into said periscope tube, with said azimuth scale beam incident on said pellicle and passing therethrough, a small reflector positioned below said pellicle for then reflecting said azimuth scale beam against the opposite side of said pellicle, said pellicle positioned to transversely direct said azimuth scale beam as a real image at said common focal plane, a reticle external to said periscope tube and below said lamp means for illumination thereby, a pendulously mounted mirror positioned below said pellicle, third optical means arranged to direct a beam of said reticle illuminated by said lamp means downwardly incident on through said pellicle to said pendulous mirror, said pendulous mirror reflecting said reticle beam to be incident against the opposite side of said pellicle, said pellicle positioned to transversely deflect said reticle beam and create a real image of said reticle at said common focal plane, said small reflector laterally displaced from the path of the reticle beam and of sufficient dimensional extent to reflect the azimuth beam while avoiding interference with the reticle beam, said pellicle reflecting both said reflected scale beam and illuminated reticle beam into said focal plane of said eyepiece, whereby simultaneous observation at the eyepiece is afforded of real images of the celestial body, reflected scale portion and the illuminated reticle.

2. An optical system as claimed in claim 1, in which said lens arrangement of said second optical means includes an eccentrically mounted lens to provide a means of shifting laterally the illuminated scale image into alignment with said small reflector as a means of beam sighting.

3. An optical system as claimed in claim 1, in which the third optical means includes prism means intermediate said reticle and said pellicle which directs the illuminated reticle beam to the pendulous mirror, said prism means comprising a rhomboid shaped prism with one tip intercepting the reticle beam and the other tip projecting the beam to the pendulous mirror.

References Cited by the Examiner

UNITED STATES PATENTS

| | | | |
|---|---|---|---|
| 1,913,793 | 6/33 | Clementi et al. | 88—2.2 |
| 2,266,741 | 12/41 | Crane et al. | 88—2.2 |
| 2,410,667 | 11/46 | Luboshez | 88—1 |
| 2,505,819 | 5/50 | Wrigley | 88—2.7 |
| 2,579,903 | 12/51 | Carbonara | 88—2.7 |
| 2,894,330 | 7/59 | Carbonara | 88—2.2 |
| 2,976,760 | 3/61 | Callahan | 88—2.6 |

DAVID H. RUBIN, *Primary Examiner.*

EMIL G. ANDERSON, *Examiner.*